F. UPSHAW.
CULTIVATOR.
APPLICATION FILED OCT. 8, 1909.

948,262.

Patented Feb. 1, 1910.

Witnesses

Inventor
Foy Upshaw
By J. Walter Fowler
Attorney

UNITED STATES PATENT OFFICE.

FOY UPSHAW, OF COLLINSVILLE, TEXAS.

CULTIVATOR.

948,262.  Specification of Letters Patent.  Patented Feb. 1, 1910.

Application filed October 8, 1909. Serial No. 521,705.

*To all whom it may concern:*

Be it known that I, FOY UPSHAW, a citizen of the United States, residing at Collinsville, in the county of Grayson and State of Texas, have invented certain new and useful Improvements in Cultivators, of which the following is a specification.

This invention relates to certain improvements in cultivators, and more particularly to that class in which the shovel point or cultivator tooth is pivotally connected to the lower end of the cultivator beam.

The essential object of the invention is to provide a simple and effective means for adjusting the angle of the cultivator tooth or shovel relatively to the beam; and incidentally, regulating the depth which the point of the shovel penetrates the ground.

With these and other objects in view the invention consists of the parts and the constructions and arrangements of parts which I will hereinafter describe and claim.

Figure 1:
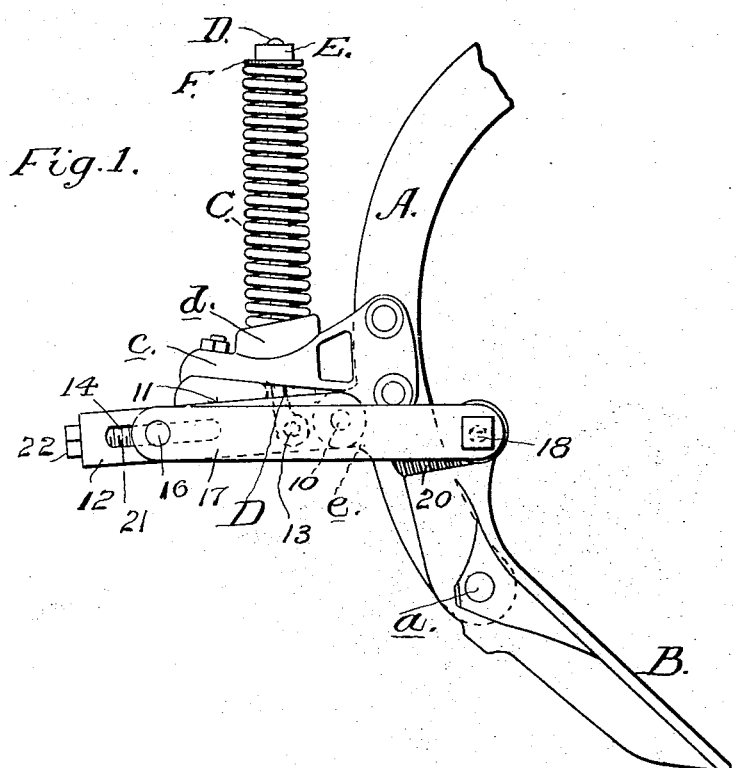
Figure 2:
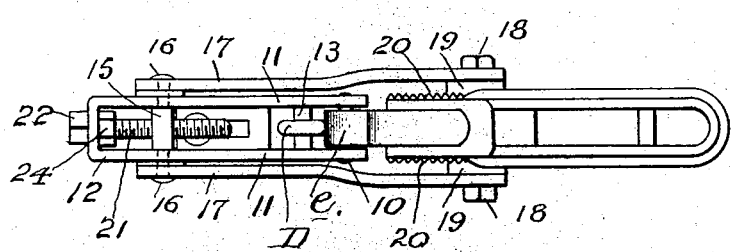
Figure 3:
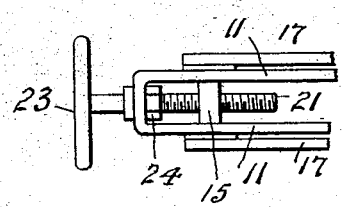

In the accompanying drawings forming a part of this specification and in which similar reference characters indicate like parts in the several views, Figure 1 is a side elevation of a portion of a cultivator beam with its shovel or point, showing my invention applied thereto. Fig. 2 is a bottom plan view of the same. Fig. 3 is a modification to be referred to.

In the said drawings I have illustrated my improvements as connected or attached to a well known type of cultivator, namely one wherein the shovel point is pivotally connected to the beam and where provision is made for the point to yield or spring back in passing over an obstruction and to be restored to its normal position after the obstruction is passed; it will be understood, however, that the salient features of my invention are not limited to this particular type of cultivator, but that said invention comprehends and includes any agricultural implement for cultivating the ground and which comprises a pivotally mounted tooth or shovel or other digging implement.

The cultivator beam, A, and its shovel or point, B, may be of any of the usual types, the point or shovel being pivotally connected to the lower end of the beam by a bolt, *a*, passing through an intermediate portion of the shovel and through the beam and being appropriately secured.

In the type of machine shown the beam has secured to it and projecting rearwardly a casting or block, *c*, with a socket, *d*, for one end of a spring, C, through which passes a rod, D, the upper end of which is provided with a nut, E, and washer, F, against which the upper end of the spring presses. The upper end of the rod, D, is threaded and the nut operates on this threaded portion to regulate the tension of the spring; the lower end of the spring seats in the socket through which the rod passes, and the lower end of the rod is secured as I will hereinafter mention.

On the back edge of the cultivator beam is formed a lug or other bearing, *e*, through which passes a bolt 10, the ends of this bolt projecting beyond the outer sides of the lug and being designed to receive the inner ends of the parallel members, 11, of an elongated U-shaped stirrup or yoke, 12, said arms or members being connected near their forward ends by means of a bolt, 13, and the lower end of the tension rod, D, before mentioned, having an eye which receives said bolt to thereby secure the rod fixedly in place.

In the sides or members, 11, of the stirrup or yoke, 12, are made the longitudinal slots, 14, and between the inner sides of said yoke there is mounted to slide a follower such as, a nut, 15, from opposite sides of which project journals, 16, which extend through the slots in the sides of the yoke or stirrup and to a suitable distance beyond the outside thereof to receive suitable straps or plates, 17, which extend forwardly along the sides of the arms or members, 11, of the yoke and to a point proximate to the upper front angle or end of the cultivator point or shovel, B, and are connected therewith by means of a bolt, 18, passing through the forward ends of said plates or straps and through the upper front end of the shovel or cultivator point, this bolt being secured by any of the methods usually employed in this art for similar purposes. In the construction shown suitable washers, 19, are introduced between the inner sides of the straps or plates, 17, and the adjacent sides of the cultivator tooth, and the adjoining surfaces of these washers and of the shovel or point may be provided with teeth or corrugations, 20, to assist in rigidly holding the parts, but which feature is no part of my present invention.

The aforesaid follower or traveling nut, 15, which operates between the inner sides of the U-shaped yoke is provided with a centrally threaded opening through which operates a screw, 21, which screw extends rearwardly through an appropriate opening in the bight or closed end of the yoke. The outer end of the screw may be provided with any well known form of nut, 22, adapted to be operated by hand or by the application of a wrench or other suitable tool; if desired, a hand wheel, 23, as shown in Fig. 3, may be used as the means for operating the screw. The screw has a rigid collar, 24, which lies just inside of and bears against the closed end of the yoke or stirrup and thus holds the screw against longitudinal movement, but allows the screw to be rotated to advance or retract the nut and through the outside plates or straps which are connected to the nut, impart movement to the upper end of the cultivator shovel or point thereby causing the latter to swing about its pivot to change the angle of the lower or working portion of the shovel and, incidentally, regulate the depth which the point of the shovel shall enter the ground.

By the means described the operator is permitted to adjust the cultivator tooth and fix the same in its adjustment with but little difficulty and whenever the condition of the ground makes it necessary to change the angle of said shovel.

It will, of course, be understood that various changes in the form, proportion and the minor details of construction may be resorted to without departing from the salient features and essential advantages of this invention.

Having thus described my invention what I claim and desire to secure by Letters Patent is:

1. In a cultivator, the combination with the beam thereof and a pivotally mounted shovel or point, of means for adjusting said shovel or point, said means including a guide, a follower slidably mounted therein, means connecting the follower to the shovel at one side of the pivotal connection of the latter, and means for operating the follower.

2. In a cultivator, the combination with the beam thereof and its shovel or point, said shovel being pivotally mounted between its ends to the beam, of means for adjusting the shovel, said means including a member secured to the beam and extending rearwardly therefrom, a follower operating relatively to said member, means connecting the follower to the shovel at one side of the pivoted connection of the latter, and means for operating the follower.

3. In a cultivator, the combination with the beam thereof, and a pivotally mounted shovel or point, of means for adjusting said shovel or point, said means including a U-shaped stirrup extending in rear of the beam and connected thereto, said stirrup having longitudinal slots, a follower between the inner sides of the stirrup having ends slidably mounted in said slots, connections between the follower and the upper end of the shovel and means for operating the follower.

4. In a cultivator, the combination of a beam, a shovel pivotally mounted thereon, a substantially U-shaped stirrup extending rearwardly from the beam, a screw turnably mounted in the rear end of the stirrup, and held against longitudinal movement therein, said stirrup having slotted sides, a follower between the sides of the stirrup having end journals passing through said slots, and plates extending along the outer sides of the stirrup having one end connected to said journals and the opposite end connected to the shovel at one side of the pivot thereof.

In testimony whereof I affix my signature in presence of two witnesses.

FOY UPSHAW.

Witnesses:
W. J. McGAUGHY,
J. D. HART.